United States Patent [19]

Bussan et al.

[11] Patent Number: 4,706,169
[45] Date of Patent: Nov. 10, 1987

[54] LIGHTING SYSTEM FOR APPLIANCE DIALS

[75] Inventors: Marc R. Bussan, Knights Township, Vanderburgh County; Sylvester A. Winternheimer, Center Township, Vanderburgh County, both of Ind.

[73] Assignee: Whirlpool Corporation, Benton Harbor, Mich.

[21] Appl. No.: 939,151

[22] Filed: Dec. 8, 1986

[51] Int. Cl.⁴ .............................................. G01D 11/28
[52] U.S. Cl. ....................................... 362/26; 362/32; 62/125
[58] Field of Search ..................... 62/125, 126; 362/32, 362/26

[56] References Cited

U.S. PATENT DOCUMENTS 2,290,278  7/1942  Failla .
2,672,117  3/1954  Morphew ............................... 362/26
2,737,744  4/1952  Sturges et al. .
3,040,458  6/1962  Mathews .
3,278,738  10/1966  Clark .
3,699,915  10/1972  Greene .
3,781,537  12/1973  Ramsey .
4,383,288  5/1983  Hess, II et al. .

OTHER PUBLICATIONS

Blumenfeld et al., "Parts that Glow", 1959, 10 pages, Design Staff Rohm & Hass Co., Philadelphia, Pa.

Primary Examiner—Carroll B. Dority, Jr.
Attorney, Agent, or Firm—Lowe, Price, LeBlanc, Becker & Shur

[57] ABSTRACT

An acrylic lightpipe transmits light from the lamp compartment of a refrigerator to the inner surface of an indexed control dial for backlighting. The lightpipe is supported within the refrigerator by a bracket positioned in proximity to the dial to be illuminated. Integral extensions formed on the light pipe are gripped by the bracket to prevent the lightpipe from rotating or translating with respect to the dial. The lightpipe is cantilevered by the bracket to backlight only a selected portion of the dial. The light emitting end face of the lightpipe is planar and angled to form an obtuse angle with the axis of the pipe to efficiently illuminate the dial.

31 Claims, 9 Drawing Figures

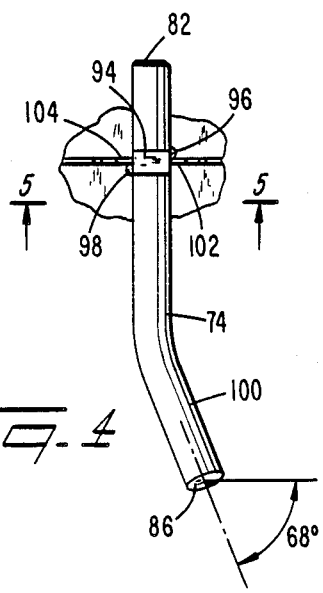
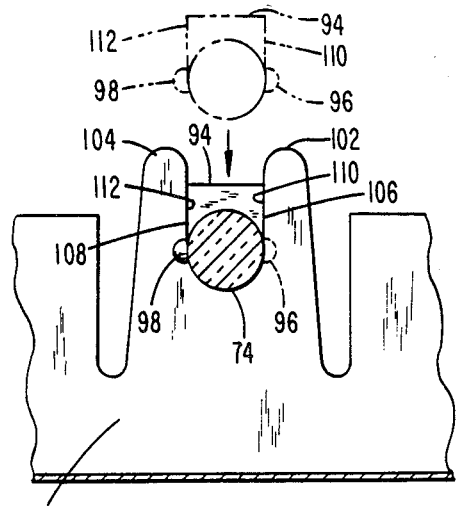
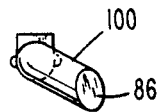
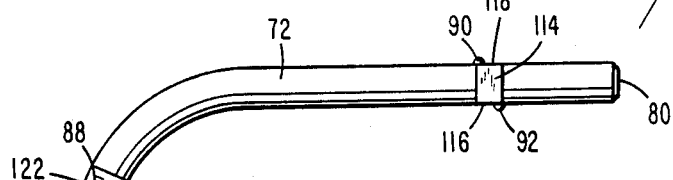
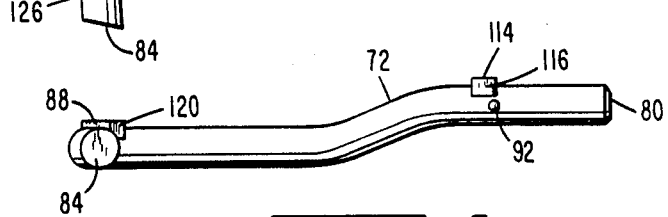

LIGHTING SYSTEM FOR APPLIANCE DIALS

BACKGROUND OF THE INVENTION

1. Field of the Invention

This invention relates to apparatus for lighting an appliance dial and, more particularly, to backlighting for a control dial of a refrigerator using light generated by a remote compartment lamp.

2. Background of the Invention

Various household appliances, e.g. refrigerators, are provided with indexed dials that are manually operated by a user to obtain a selected performance setting. Such dials are frequently connected to high voltage control elements of the appliance and are rotatably supported in the cabinet of the appliance, so that only a small portion of the dial is accessible by the user. Since the user often has wet hands while using the appliance, as an important safety feature the dial supporting structure is typically designed to shield the user from sources of electricity.

From both practical and cosmetic considerations, it is highly desirable to provide backlighting for the indexed information on such control dials, so that a user may know precisely which setting is chosen even when the ambient lighting is inadequate to fully illuminate the indexed surface of the dial. For both safety and convenience, therefore, it is particularly desirable to backlight only a selected portion of the indexed surface of the dial without locating electrically powered lightbulbs immediately adjacent thereto.

It is known to illuminate an object by means of a transparent, generally cylindrical, transparent element commonly known as a "lightpipe" to propagate light generated from a remote source to the vicinity of a surface of the object. The most convenient light source for use with such a light pipe in an appliance is generally the compartment lamp for the appliance, e.g., the refrigerator compartment.

However, the commonly used form of the cylindrical control dial, rotatably mounted on a shaft, presents two major obstacles to positioning the discharge end of a light pipe directly behind the forward face of the dial in order to backlight the indicia thereon. First, the central location of the mounting shaft within the cylindrical dial body prevents direct lighting access to the outwardly most visible portion of the dial face from the rear thereof. Second, the dial has a perimeter wall that prevents a lightpipe from approaching the rear of the face directly.

Although it is possible to form a transparent lightpipe into a serpentine shape in order to place the light-delivering end directly behind the dial surface most visible to a user, such a structure would involve very tight radii that would cause significant loss of illumination by the light being conducted in the lightpipe. Also, to prevent any accidental electrically-conductive contact between a user and the high voltage elements of the appliance, the lightpipe is best passed through a confining opening in the appliance structure to be cantilevered behind the visible surface of the dial. Finally, keeping in mind that appliances will be subject to considerable shock and vibration during transportation to the user and, once in service, have doors that are frequently slammed and motors that cause vibration, it is imperative that the light-delivering end of the lightpipe be precisely and firmly supported within the structure.

Various solutions, none of which utilize cantilevered lightpipes, have been attempted by persons skilled in the art, with varying success. Thus, for example, U.S. Pat. No. 3,040,458, to Mathews, discloses the use of a lighted bulb very close to a transparent ring surrounding an indexed cylindrical surface of a control dial. The light rays entering the transparent ring at an angle from the light source are retained by internal reflection within the transparent ring and are reflected outward from the numerals or indicia of the control dial at a display window. It is pointed out in this patent that there can be no wetting of the interface between the transparent ring 2 and the outer surface of the dial, e.g., as may be the case where there is condensation in a kitchen, as this would frustrate the effectiveness of the system.

U.S. Pat. No. 2,737,744, to Sturges et al, utilizes a plurality of light bulbs located within holes in a transparent element which is shaped to funnel light to both sides of a plurality of dials that are lighted from the sides.

U.S. Pat. No. 3,278,738 to Clark, teaches the use of carefully bonded optical fibers with shaped ends to transmit light from one end of the optical fiber bundle to direct emitted light to a selected small portion of a dial.

U.S. Pat. No. 4,383,288, to Hess, II et al, discloses a light collector structure that includes a lens portion with angled sections for gathering light from a broad area and provided with a circular groove that snugly fits into a portion of the supporting structure.

U.S. Pat. No. 2,290,278, to Failla, discloses the use of a clamped lightpipe that conveys light from a remote light bulb to the adjacently placed central hubs of a minute and an hour hand of a clock, so that the light is conveyed through these hands and out their distal ends to be directed to numbers provided on the clock dial.

None of these prior art devices solves the specific problem addressed by this invention, namely the provision of precisely directed lighting to safely backlight the surface of a rotatable dial which is connected to high voltage elements of a refrigerator or other household appliance.

A need, therefore, exists for a sturdy lightpipe system that efficiency and safely transmits light from a remote source to precisely backlight selected indicia on a rotatable and user-touchable control dial for a household appliance.

DISCLOSURE OF THE INVENTION

Accordingly, it is an object of this invention to provide a system for illuminating the control dial of a household appliance, such as a refrigerator, by means of light generated remotely by a compartment lamp of the appliance.

It is another object of this invention to provide light for backlighting a cylindrical control knob rotatably mounted on a center shaft by means of a lightpipe extending from a compartment lamp of the appliance to the rear of the visible surface of the control knob.

A further object of this invention is to provide structure for mounting, within the control dial of a refrigerator, a light pipe to establish accurate positional stability of a cantilevered light delivering end of the lightpipe adjacent the display surface of the dial.

Yet another object of this invention is to provide within a refrigerator a mounting structure for a lightpipe that will facilitate disposition of the lightpipe between a remote light source and a control dial, past intervening obstacles and through narrow spaces within the refrigerator while shielding the user from sources of dangerous high voltages at the light source.

These and other objects of this invention are realized in a conventional refrigerator or other appliance by transmitting light from a remote light source within a lighted compartment to an appliance control dial.

The control dial has the form of a cylinder with a circular base and a peripheral wall that has interior and exterior cylindrical surfaces with translucent portions bearing indicia visible at the exterior surface when the interior surface is illuminated. The control dial is mounted on a shaft rotatably supported by the cabinet, such that a portion of the cylindrical exterior surface of the knob, and thus the indicia thereon, is visible to and accessible by a user. A light-gathering end of the lightpipe is located adajacent to the remote light source, typically a lamp that lights a refrigerator compartment, and an opposite light output end is located adjacent the interior surface of the control knob while avoiding contact between the light pipe and the shaft or the peripheral wall of the control knob. The lightpipe is supported intermediate its ends by a bracket which is itself supported by the refrigerator cabinet.

Still other objects and advantages of the present invention will become readily apparent to those skilled in the art from the following detailed description, wherein only the preferred embodiment of this invention is disclosed in detail simply by way of illustration of the best mode contemplated for carrying out the invention. As will be appreciated, this invention is amenable to other and different embodiments, and its several details are capable of modification in various obvious respects, all without departing from the invention. Accordingly, the drawing and description are to be regarded as illustrative and not restrictive in nature.

BRIEF DESCRIPTION OF THE DRAWINGS

FIG. 4 is an enlarged plan view of a single lightpipe supported by a single bracket in a structure like that shown in FIG. 2.

FIG. 5 is an elevation view at section 5—5 of FIG. 4.

FIG. 6 is a perspective end view of the cantilevered end of the lightpipe of FIG. 4.

FIG. 7 is a plan view of a second lightpipe as used in the structure of FIG. 2.

FIG. 8 is an elevation side view of the lightpipe of FIG. 6.

DETAILED DESCRIPTION OF THE PREFERRED EMBODIMENT

Figure 1:
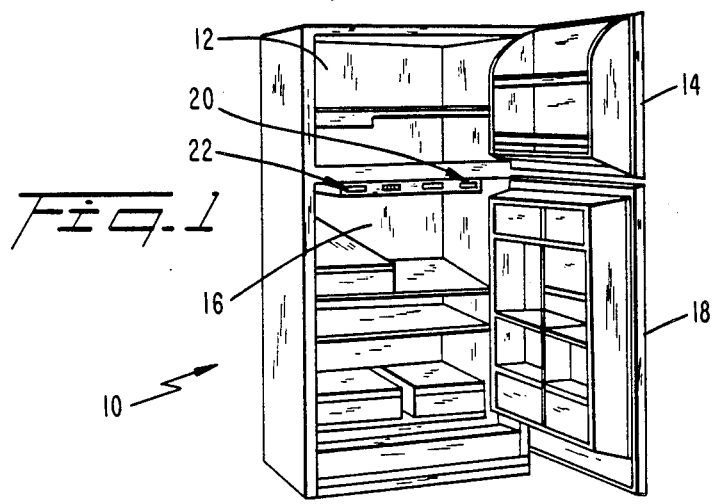
FIG. 1 is a perspective view of a typical refrigerator-freezer combination unit with its doors open.

The apparatus of this invention, to be described in further detail hereinbelow, is most advantageously employed in a refrigerator-freezer combination unit 10, best seen in FIG. 1. Such a unit, typically has a freezer compartment 12 with a door 14, located above a somewhat larger refrigeration compartment 16 provided with another door 18. Adjustment and control dials, typified by 20 and 22, which may control the compressor (not shown) and damper (not shown) are commonly located near the top of the refrigerated compartment 16 and immediately below the divider between freezer compartment 12 and refrigerator compartment 16. This invention relates to backlighting illumination for indicia on such dials.

Figure 2:
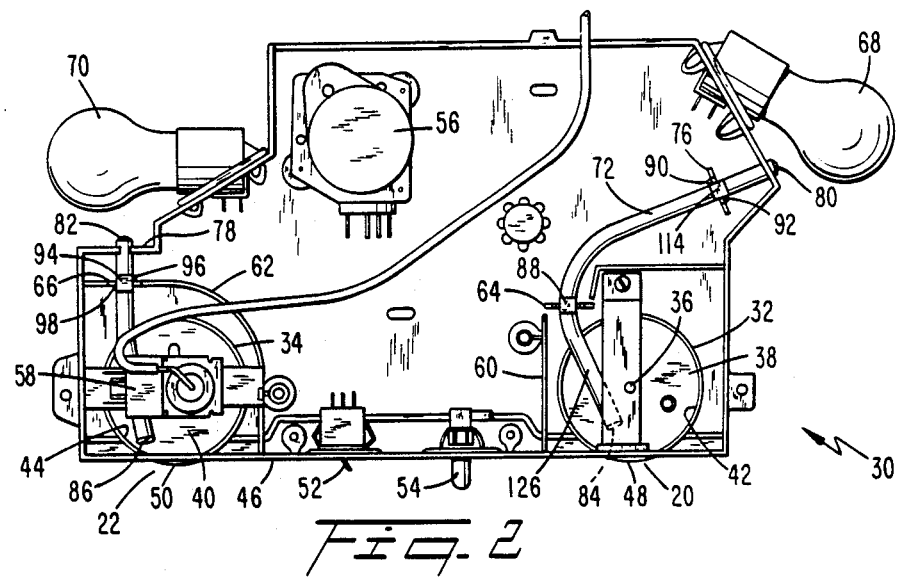
FIG. 2 is a plan view of a relevant portion of the appliance control elements, showing the relative dispositions of typical light sources, lightpipes, and useraccessible control dials.

FIG. 2 provides a plan view of a portion of the structure immediately behind typical control dials 20 and 22. The following discussion focuses on how the structure and apparatus of this invention may best be utilized to backlight indicia carried on the normally vertically aligned cylindrical walls 32 and 34 of two such dials.

As best seen in FIG. 2, 42 and 44 are the inner cylindrical surfaces, respectively, of cylindrical walls 32 and 34 of the two dials 20, 22. Portions 48 and 50, respectively, of cylindrical walls 32 and 34, each displaying useful indicia, are visible to and accessible by a user of the refrigerator. Cylindrical portions 48 and 50 of the dials project slightly outwardly from corresponding apertures (not numbered) in a normally flat vertical wall-like surface 46 of a supporting frame 30. Dials 20, 22 are rotatable about central shafts typified by shaft 36 coaxial with the cylindrical wall 32 of control dial 20. Such a cylindrical wall 32 is connected to its central shaft 36 by a flat and normally horizontal planar web 38. Web 40 is the counterpart of web 38 in the second control dial 22 shown in FIG. 2.

Figure 3:
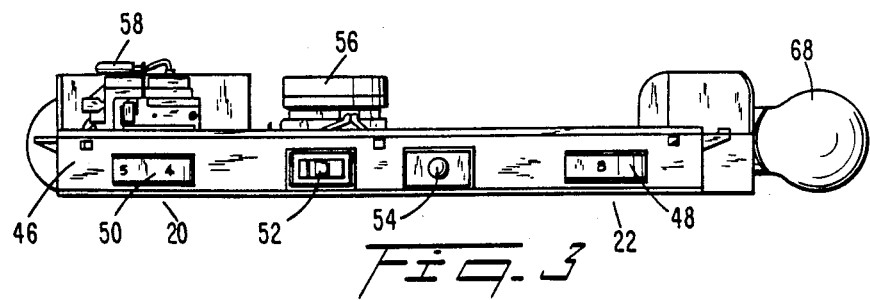
FIG. 3 is an elevation view of the structure shown in plan view in FIG. 2.

The typical supporting frame 30, as best seen in FIGS. 2 and 3, also includes additional generally vertically disposed walls 60 and 62 which respectively define enclosures about control dial walls 32 and 34. One principal purpose of walls 60 and 62 is to isolate control dials 20, 22 from control wiring located behind and to the outside of such walls to prevent the wiring from interfering with the movement of the dials. A second and more immediately useful purpose of such walls is to provide the bracket like structures generally identified as 64 and 66 in FIG. 2.

Light bulbs such as 68 and 70, as best seen in FIG. 2, are usually located in a position that provides lighting of the refrigeration compartment when a user opens door 18. It is a principal purpose of this invention to utilize some of the light generated by bulbs 68 and 70 by transmitting and delivering it in a precisely directed manner to selected portions of internal surfaces 42 and 44 of the typical dials that a user can employ to change the performance settings of the appliance.

As best seen in FIG. 2, lightpipe 72 is supported by second brackets 76 formed in frame 30. Similarly, lightpipe 74 is supported by brackets 78 and 102. Light pipes 72 and 74 are typically made of a clear transparent material, preferably an acrylic plastic for use with refrigeration units, bent as needed to pass from bulbs 68 and 70 to respective surfaces 42 and 44 of the dials while avoiding obstacles and passing through relatively confined zones therein.

The typical refrigerator has a compressor (not shown) which periodically produces minor vibrations of varying degrees. Furthermore, the typical user occasionally slams doors 14 and 18 of the refrigerator, with sufficient force to cause substantial shaking of the structure supporting the control dials in place. It is, therefore, important that any light-transmitting elements such as lightpipes 72 and 74 be supported very firmly in place. For ease and economy in the manufacturing of such units, it is also necessary that lightpipes 72 and 74 be assembled with a minimum of difficulty. Finally, as best seen in FIG. 2, it is necessary that portions of lightpipes 72 and 74 be supported so that the light delivery ends thereof are essentially cantilevered downward past vertical control dial walls 32 and 34, and miss central shafts such as 36, to deliver transmitted light through light-delivering end surfaces such as 84 and 86 very close to and behind the respective inner cylindrical surfaces such as 42 and 44.

For a typical three-dimensionally twisted light pipe such as 72 or 74, it is, therefore, important that the lightpipe not move either in rotation or in translation from its intended position which is carefully selected to provide the most efficient illumination by transmittal of light from light sources 68 and 70 to the inner cylindrical surfaces 42 and 44, respectively. Thus it is necessary that lightpipe 72 or 74 be very rigidly and precisely supported by the bracket structures 64, 66 and 76. How this is accomplished in the present invention is now described by reference to FIGS. 4 and 5.

Thus, as best seen in FIG. 4, lightpipe 74 is provided with an integral extension 94 having a generally rectangular cross-section in plan view. This extension 94, as best seen with reference to FIG. 5, has symmetrically disposed generally vertical parallel sides 110 and 112. Sides 110 and 112 of this first extension 94 are spaced apart to a distance that is virtually equal to but preferably very slightly larger than the space that separates the vertical inner edges 106 and 108 of fingers 102 and 104 of a typical bracket element 66. The lowest portion of bracket 66, between parallel inner sides 106 and 108, is preferably formed to match the outer surface topology of light pipe 74. The length of the first extension 94 of lightpipe 74 parallel to the axis of the pipe is somewhat greater than the thickness of fingers 102 and 104 of bracket 66.

While extension 94 ensures that there will be no relative rotation between the lightpipe 74 and its supporting bracket 66, it is also necessary to prevent translation between the two. This avoidance of relative translation between a lightpipe 74 and its supporting bracket 66 is obtained in this invention by second and third extensions 96 and 98, respectively, integral with lightpipe 74 immediately adjacent the first extension 94. For convenience of manufacture, these extensions 96 and 98 may preferably have the form of hemispherical buttons formed integral with the generally cylindrical form of lightpipe 74. As best seen in FIG. 5, extensions 96 and 98 are diametrally disposed on either side of lightpipe element 74 about a horizontal diameter and, as best seen in FIG. 4, they are displaced from each other in the direction of the axis of lightpipe element 74 by a distance only very slightly larger than the thickness of fingers 102 and 104.

By this unique and economical structure of very small extensions 94, 96 and 98, each made integral with lightpipe 74, a very firm, non-rotating and non-translating support is provided by bracket 66 to lightpipe element 74 when the latter is forcibly inserted between fingers 102 and 104. Specifically, the desired results are obtained by the lateral inward pressure of the vertical edges 106 and 108, of vertical fingers 102 and 104 respectively, on the vertical parallel surfaces 110 and 112 of extension 94, while the thickness of fingers 102 and 104 closely fits in between the contacting surfaces of extensions 96 and 98 respectively.

It will be immediately appreciated by persons skilled in the art, upon a full understanding of the structure disclosed in FIGS. 2-4, that only one set of extensions such as 94, 96 and 98 is required for each lightpipe to ensure the desired stable and firm positioning of the light pipe within the support structure of the appliance, so long as an additional simple bracket, such as 76 for relatively long lightpipe 72, is also provided. In other words, it is not necessary that the lightpipe itself also have commensurately located extensions, such as 96 and 98, for each of the pair of brackets supporting a particular lightpipe at two different locations. This feature of the structure of the lightpipes, according to this invention, has a particularly valuable advantage in the ease of assembly of lightpipes such as 72 and 74 with support structures like those disclosed in FIGS. 2 and 3 hereof. Considerable flexibility of design is thus available to the designer of the support structure of the type disclosed herein.

Thus, for example, a relatively long lightpipe such as 72 may conveniently be supported by a simple bracket 76, which serves only to prevent rotation of extension 114 of lightpipe 72, together with another bracket 64 which provides firm non-rotating gripping of extension 88 together with non-translating contact between extensions 92 and 90. In the alternative, for a relatively short lightpipe such as 74, the light receiving end may be pushed through a closely fitting circular aperture 78 that has a diameter only slightly larger than the diameter of lightpipe 74, while extensions 94, 96 and 98 in cooperation with fingers 102 and 104 of a typical bracket 66 provide the requisite nontranslating and non-rotating support to ensure firm, stable, and precise location of lightpipe 74 in the supporting structure of the appliance.

The structural details of a typical longer light pipe such as 72 are best seen in plan view in FIG. 7 and in side elevation view in FIG. 8. Note particularly that extension 114 has two parallel sides 116 and 118, and is accompanied by lateral extensions 90 and 92, which are structurally identical to extensions 96 and 98 on lightpipe 74, to prevent translation. However, vertical extension 88, with parallel sides 120 and 122, is not accompanied by lateral extensions.

As best seen with reference to FIG. 6, the cantilevered distal end 100 of lightpipe 74 is inclined downward in order to overlap the top edge of cylindrical wall 34 to locate planar end surface 86 in a very precisely predetermined orientation and location with respect to inner cylindrical surface 44, to precisely and particularly deliver transmitted light to the back surface of portion 50 which carries the indicia visible to a user of the appliance.

Nothwithstanding the ability of the invention thus far described to accurately and securely position the discharge surfaces 84 and 86 of lightpipes 72 and 74 immediately behind portions 48 and 50 of the dials, limitations inherent in the use of a lightpipe with the disclosed dial structure would otherwise prevent satisfactory illumination of the dials. The primary limitation is that it would require small radii bends in a lightpipe, to circumvent the dial walls 32, 34 and mounting shafts 36 in order to approach the dial portions radially or perpendicularly. Such small radii bends allow an unacceptable amount of light to escape the lightpipe intermediate the light receiving surface and the light discharge surface. This light that escapes results in an unacceptable reduction in the transmission efficiency of the lightpipe.

As a result of considerable analysis and experimentation it was discovered that efficient and intense backlighting of the visible portions 48 and 50 of the dials could be obtained without the necessity of the longitudinal axis of the lightpipe approaching the dial portion perpendicularly. Without this necessity of approaching the dial portions perpendicularly, the discharge surface of the lightpipe can be offset from the visible portion of the dial, eliminating the need for small radii bends in the lightpipes.

Figure 9:
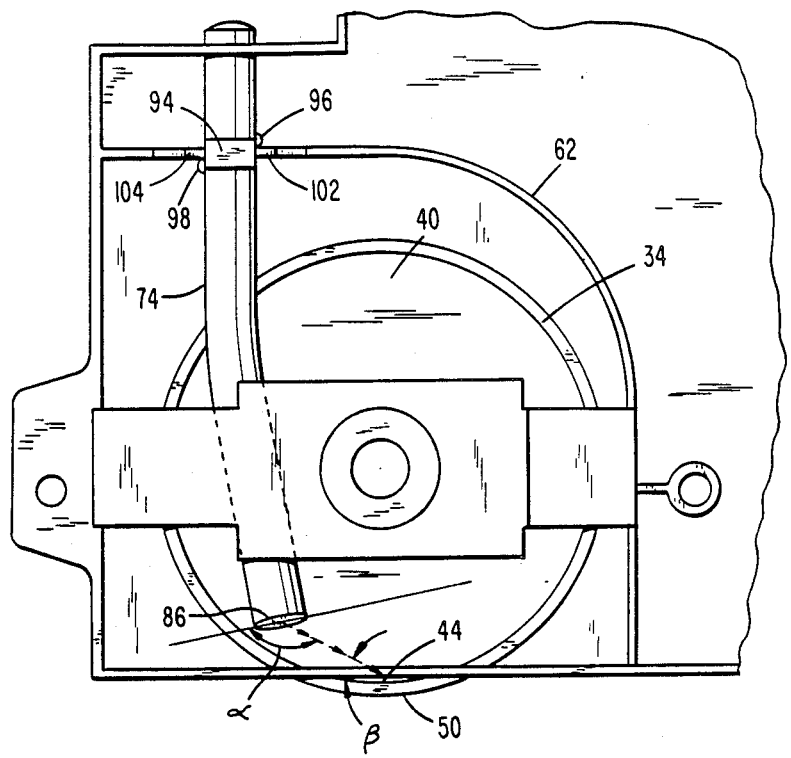
FIG. 9 is an enlarged plan view of a portion of the structure of FIG. 2.

The discharge surface of the lightpipe is offset from the visible portion of the dial, as shown in FIG. 9, without significantly reducing the intensity of light reaching the visible portion of the dial if, in any plane in which the discharge surface is offset from the center of the visible portion, the angle α between the discharge surface and the imaginary line from the center of the discharge surface to the center at the visible portion 48, 50 is greater than 90 degrees, i.e., obtuse. In FIG. 9, the lightpipe discharge surface 86 is shown horizontally offset from the visible portion 50 so the angle α is also determined in the horizontal plane. However, the above described relationship would apply for any other plane in which the center of the discharge surface is displaced from the visible portion of the dial, such as in the vertical plane. The angle α depends on the amount of offset and the refractive index of the lightpipe material. α is selected to be greater than 90° to ensure that the refracted light exiting the lightpipe discharge surface will be transmitted in a direction directly toward the visible portion of the dial. As a result, a substantial portion of the light discharged from the lightpipe is intercepted by the visible portion of the dial, thus increasing the illumination level at the dial. Determination of the optimum value of α for a given application is believed to be well within the level of knowledge of one skilled in the art.

Persons skilled in the art will appreciate that the structure of the lightpipes as taught by this invention, i.e., the addition of the same transparent material to form extensions such as 94, 96 and 98 of lightpipe 74, avoids diminution of the transmitted light through the lightpipe and enables efficient and economical manufacture of the lightpipes to ensure translation- and rotation-free location in the appliance structure. Such persons will also appreciate that the disclosed obtuse relationship between the lightpipe discharge surface and the visible portion of the dial enables highly desirable precise backlighting of the selected visible portion of a control dial while disposing the lightpipe to avoid the central shaft and the vertical cylindrical wall of the typical control dial without requiring small radii bends in the lightpipe. Finally, such persons will also appreciate that the particular manner for supporting lightpipes as disclosed in this invention serves to ensure that any accidental moisture deposited on the outer surface of a rotating dial will not be carried to locations where it may create a possible electric shock hazard to a user.

As a practical matter, for use in refrigerators wherein the lightpipe itself is not likely to be subjected to very high temperatures, it is most convenient and economical to use clear acrylic plastic for the lightpipes. First, such acrylic plastics are very easily molded, so that the required extensions to avoid translation and rotation within the supporting brackets are easily formed in a conventional molding process. Furthermore, the softness of such acrylic plastics makes it particularly easy to manufacture such lightpipes with planar end faces at the optimum angles with respect to the access of the immediately adjacent cylindrical cantilevered portions thereof. It will be appreciated by persons skilled in the art, however, that the benefits of this invention need not be limited to the use of acrylic lightpipes, as other transparent materials may be utilized.

For efficient light reception at the light-receiving end of the lightpipe located near a relatively large light source, e.g., a refrigerator compartment lamp, this end of the light pipe is preferably formed to have a curved convex surface. This makes the light-receiving surface larger and allows more of the incident light rays to enter the lightpipe material close to the local outward normal. This ensures an ample supply of light to be transmitted to the dial.

It is anticipated that persons skilled in the art, armed with the knowledge provided by this disclosure, will contemplate a variety of modifications in the structure and uses of this invention. All such modifications and variations are expressly contemplated as being encompassed within the claims appended below.

What is claimed is:

1. For use in a refrigerator having a cabinet defining a compartment and a light source for illuminating said compartment, an illuminated dial comprising:
   a cylindrical control knob comprising a circular base and a peripheral wall extending axially from the circumference of said base and defining an interior surface and an exterior surface, said peripheral wall being partially translucent and bearing indicia spaced around the translucent portion of said control knob and visible from the exterior of the knob when said interior surface is illuminated;
   a shaft, supported by a portion of said cabinet, to rotatably mount said control knob in said cabinet with a portion of said exterior surface visible and accessible to a user;
   an elongated transparent lightpipe member, having a light-gathering surface adjacent said light source and a light output end adjacent said peripheral wall interior surface, said lightpipe member being formed to avoid contact with said peripheral wall and said shaft; and
   a bracket means supported by said cabinet for receiving and non-rotatably and non-translatably supporting said lightpipe member intermediate said light gathering and light output surfaces thereof.

2. An illuminated dial according to claim 1, wherein:
   said lightpipe member is formed to be smoothly curved in its passage, past any intervening obstacles and through confined spaces in said compartment, between said light source and said illuminated dial.

3. An illuminated dial according to claim 2, wherein:
   a portion of said elongated lightpipe member ending in said light output surface is cantilevered from said bracket means.

4. An illuminated dial according to claim 3, wherein:
   said light output surface is planar and is disposed to deliver output light nonorthogonally to said peripheral wall interior surface.

5. A light-transmitting system for transmitting light from a remote light source past intervening obstacles and through confined spaces inside the cabinet of a refrigerator to illuminate a portion of a control dial thereof, comprising:
   a lightpipe having a light-receiving end disposed to receive light from said remote light-source and a light-delivering end disposed to deliver a substantial portion of said received light so as to illuminate said portion of said dial;

at least one bracket means, retained by said cabinet, for receiving and supporting said lightpipe intermediate said light-receiving and light-delivering ends thereof;

rotation-preventing means integral with said lightpipe and retained within said bracket means for preventing rotation of said lightpipe within said cabinet; and translation-preventing means integral with said lightpipe and retained within said bracket means for preventing translation of said lightpipe within said cabinet;

whereby said bracket means, said rotation-preventing means and said translation-preventing means firmly cantilever said light-delivering end of said lightpipe in a fixed predetermined position with respect to said control dial.

6. Apparatus according to claim 5, wherein:
said lightpipe is formed to curve in all three dimensions in its passage past said intervening obstacles and through said confined spaces within said refrigerator.

7. Apparatus according to claim 5, wherein:
said light-receiving end of said lightpipe is formed to present a convex surface toward said light source for efficient reception of light therefrom.

8. Apparatus according to claim 5, wherein:
said cantilevered light-delivering end of said lightpipe is a planar surface laterally displaced from said control dial and oriented relative to the immediately adjacent longitudinal axis of the lightpipe such that rays of said delivered light emitted from said planar surface toward said dial are nonorthogonal to said planar surface.

9. Apparatus according to claim 7, wherein:
said cantilevered light-delivering end of said lightpipe is a planar surface laterally displaced from said control dial and oriented relative to the immediately adjacent longitudinal axis of the lightpipe such that rays of said delivered light emitted from said planar surface. toward said dial are nonorthogonal to said planar surface.

10. Apparatus according to claim 9, wherein:
said planar surface is nonorthogonal to an immediately adjacent portion of the longitudinal axis of said lightpipe.

11. Apparatus according to claim 9, wherein:
said dial comprises a user-touchable cylindrical peripheral wall having an inner surface and an outer surface and bearing light-transmitting index markings and a central hub connected thereto by a diametrally planar web;

said refrigerator contains an electrical component controlled by a high voltage control, operated by said dial;

said cabinet is formed to rotatably support said dial, and said bracket means is formed integrally with said cabinet; and said cantilevered light-delivering end of said lightpipe is located radially inward of said cylindrical wall of said dial, whereby light delivered to said inner surface thereof backlights said light-transmitting index markings to render them visible to a user viewing the outer surface of said cylindrical wall of said dial.

12. Apparatus according to claim 11, wherein:
said bracket means comprises two upstanding resilient fingers for receiving said light pipe, said fingers being of a first thickness and coplanar in a plane essentially normal to the axis of said lightpipe received therebetween; and said fingers have respective distal ends with parallel adjacent inside edges, spaced apart by a distance slightly smaller than the diameter of said lightpipe received therebetween, a portion of said inside edges being profiled to firmly contact said lightpipe.

13. Apparatus according to claim 12, wherein:
said rotation-preventing means comprises a first lateral extension integral with said lightpipe, said first lateral extension being formed to have two side surfaces symmetrically parallel on opposite sides of the axis of said lightpipe, and said side surfaces being spaced apart by a distance only slightly larger than the distance separating said parallel inside edges of said fingers of said bracket so as to be firmly contacted by the same when said lightpipe is received between said fingers.

14. Apparatus according to claim 13, wherein:
said translation-preventing means comprises second and third lateral extensions, each integral with said lightpipe, said second and third lateral extensions being essentially coplanar with respect to each other in a plane normal to said parallel sides of said first lateral extension and spaced apart in the direction of said axis of said lightpipe by a distance essentially equal to said first thickness of said fingers of said bracket, whereby reception of said lightpipe in said bracket with said second and third lateral extensions being located on opposite sides of said fingers prevents translation of said lightpipe with respect to said bracket.

15. Apparatus according to claim 13, wherein:
said translation-preventing means comprises second and third lateral extensions, each integral with said lightpipe, said second and third lateral extensions being essentially coplanar with respect to each other in a plane normal to said parallel sides of said first lateral extension and spaced apart in the direction of said axis of said lightpipe by a distance essentially equal to said first thickness of said fingers of said bracket, whereby reception of said lightpipe in said bracket with said second and third lateral extensions being located on opposite sides of said fingers prevents translation of said lightpipe with respect to said bracket.

16. Apparatus according to claim 15, wherein:
said lightpipe and all lateral extensions thereof are made of clear acrylic plastic.

17. Apparatus according to claim 15, wherein:
said remote source of light is a compartment light of said refrigerator.

18. Apparatus according to claim 15, wherein:
said lightpipe has a circular cross-section.

19. Apparatus according to claim 15, wherein:
said cabinet includes a light compartment to maintain safe separation between a user and said high-voltage control coupled to said dial while permitting passage of said lightpipe from its light-receiving end adjacent said remote light source to its light-delivering end adjacent said dial.

20. A light-transmitting system for transmitting light from a remote light source past intervening obstacles and through confined spaces inside the cabinet of a refrigerator to illuminate a portion of a control dial of the refrigerator, comprising:

a lightpipe having a predetermined disposition in said cabinet, with a light receiving end located to receive light from said remote light source, a light transmitting length free of bends sharp enough to seriously interfere with light transmission with and along said length, and a light-delivering end laterally offset from and non-orthogonal to said portion of said control dial and disposed to deliver a substantial portion of said transmitted light to illuminate said portion of said control dial, said light-delivering delivering end being a plane non-orthogonal to said illuminated portion of said control dial; and means for firmly supporting said lightpipe in said cabinet in said predetermined disposition.

21. A light transmitting system according to claim 20, wherein:

said supporting means comprises at least one bracket means, retained by said cabinet, for receiving and supporting said lightpipe intermediate said light receiving and light delivering ends thereof.

22. A light transmitting system according to claim 21, wherein:

said lightpipe comprises rotation-preventing means integral with said lightpipe and retained within said bracket means for preventing rotation of said lightpipe within said cabinet.

23. A light transmitting system according to claim 22, wherein:

said light pipe further comprises translation-preventing means integral with said lightpipe and retained within said bracket means for preventing translation of said lightpipe within said cabinet.

24. A light transmitting system according to claim 23, wherein:

said lightpipe is formed to curve in all three dimensions in its passage past intervening obstacles and through said confined spaces within said refrigerator cabinet, and said bracket means, said rotation preventing means and said translation preventing means firmly cantilever said light delivering end of said lightpipe in said offset position with respect to said control dial.

25. A light transmitting system according to claim 20, wherein:

said light receiving end of said lightpipe is formed to present a convex surface toward said light source for efficient reception of light therefrom.

26. A light transmitting system according to claim 24, wherein:

said bracket means comprises two upstanding resilient fingers for receiving said lightpipe, said fingers being of a first thickness and coplanar in a plane essentially normal to the axis of said lightpipe received therebetween; and said fingers have respective distal ends with parallel adjacent edges, spaced apart by a distance slightly smaller than the lateral dimension of said lightpipe received therebetween, a portion of said inside edges being profiled to firmly contact said lightpipe.

27. A light transmitting system according to claim 26, wherein:

said rotation preventing means comprises a first lateral extension integral with said lightpipe, said first lateral extension being formed to have two side surfaces symmetrically parallel on opposite sides of the axis of said lightpipe, and said side surfaces being spaced apart by a distance only slightly larger than the distance separating said parallel inside edges of said fingers of said bracket so as to be firmly contacted by the same when said lightpipe is received between said fingers.

28. A light transmitting system according to claim 27, wherein:

said translation preventing means comprises second and third lateral extensions, each integral with said lightpipe, said second and third lateral extensions being essentially coplanar with respect to each other in a plane normal to said parallel sides of said first lateral extension and spaced apart in the direction of said axis of said lightpipe by a distance essentially equal to said first thickness of said fingers of said bracket, whereby reception of said lightpipe in said bracket with said second and third lateral extensions being located on opposite sides of said fingers prevents translation of said lightpipe with respect to said bracket.

29. A light transmitting system according to claim 28, wherein:

said lightpipe and all lateral extensions thereof are made of clear acrylic plastic.

30. A light transmitting system according to claim 29, wherein:

said lightpipe has a circular cross section.

31. A light transmitting system according to claim 30, wherein:

said remote source of light is a compartment light of said refrigerator.

* * * * *